US012339575B2

(12) United States Patent
Pineau et al.

(10) Patent No.: US 12,339,575 B2
(45) Date of Patent: Jun. 24, 2025

(54) INFLATABLE ASSEMBLY FOR VIDEO DISPLAY

(71) Applicants: THALES, Courbevoie (FR); AIRCAPTIF, PARIS (FR)

(72) Inventors: Ekko Pineau, Merignac (FR); Nicolas Deleforterie, Merignac (FR); Emmanuel Fievet, Paris (FR)

(73) Assignees: THALES, Courbevoie (FR); AIRCAPTIF, Paris (FR)

( * ) Notice: Subject to any disclaimer, the term of this patent is extended or adjusted under 35 U.S.C. 154(b) by 138 days.

(21) Appl. No.: 17/789,118

(22) PCT Filed: Nov. 25, 2020

(86) PCT No.: PCT/EP2020/083280
§ 371 (c)(1),
(2) Date: Jun. 24, 2022

(87) PCT Pub. No.: WO2021/129993
PCT Pub. Date: Jul. 1, 2021

(65) Prior Publication Data
US 2023/0341759 A1    Oct. 26, 2023

(30) Foreign Application Priority Data

Dec. 26, 2019 (FR) ..................................... 1915504

(51) Int. Cl.
*G03B 21/585* (2014.01)
(52) U.S. Cl.
CPC ................................. *G03B 21/585* (2013.01)

(58) Field of Classification Search
CPC ........................ G03B 21/585; E04H 15/20–22
See application file for complete search history.

(56) References Cited

U.S. PATENT DOCUMENTS

| 4,103,369 A | 8/1978 | Riordan |
| 4,807,405 A | 2/1989 | Borgquist |

(Continued)

FOREIGN PATENT DOCUMENTS

| AU | 333009 S | 9/2010 |
| CN | 105 988 279 A | 10/2016 |

(Continued)

OTHER PUBLICATIONS

"Hook" 2012. In Merriam-Webster's Collegiate(R) Dictionary, 11th ed. Merriam-Webster. (Year: 2012).*

*Primary Examiner* — Leon W Rhodes, Jr.
(74) *Attorney, Agent, or Firm* — BakerHostetler

(57) ABSTRACT

An assembly for video display, includes a captive-air inflatable structure in a curved shape or a portion of a truncated sphere; a display medium; and a holding system between the inflatable structure and the display medium; the assembly wherein the holding system comprises hooks distributed over the surface of the concave part of the inflatable structure and complementary hooks distributed over the convex surface of the display medium; and in that all or some of the hooks are connected to complementary hooks positioned facing them, so that, when the inflatable structure is inflated, the hooks of the inflatable structure connected to complementary hooks of the display medium are stretched and make it possible to shape the display medium.

15 Claims, 6 Drawing Sheets

(56) References Cited

U.S. PATENT DOCUMENTS

| | | | | |
|---|---|---|---|---|
| 7,446,937 | B2* | 11/2008 | Poretskin | G03B 21/585 |
| | | | | 40/736 |
| 7,755,605 | B2* | 7/2010 | Daniel | G06F 1/1605 |
| | | | | 345/173 |
| 7,791,799 | B1 | 9/2010 | Lejeune et al. | |
| D682,382 | S | 5/2013 | Ruminski | |
| 8,578,657 | B2* | 11/2013 | Colucci | E04H 3/22 |
| | | | | 52/2.16 |
| 10,165,240 | B2* | 12/2018 | Li | H04N 9/3114 |
| 11,218,662 | B2* | 1/2022 | Someya | G03B 17/54 |
| 2015/0101258 | A1* | 4/2015 | Milo | E04B 1/3408 |
| | | | | 52/2.18 |

FOREIGN PATENT DOCUMENTS

| | | |
|---|---|---|
| DE | 20 2019 100 645 U1 | 2/2019 |
| JP | 2005-17398 A | 1/2005 |
| WO | 2007/016328 A1 | 2/2007 |

* cited by examiner 411  412  413  ...

INFLATABLE ASSEMBLY FOR VIDEO DISPLAY

CROSS-REFERENCE TO RELATED APPLICATIONS

This application is a National Stage of International patent application PCT/EP2020/083280, filed on Nov. 25, 2020, which claims priority to foreign French patent application No. FR 1915504, filed on Dec. 26, 2019, the disclosures of which are incorporated by reference in their entirety.

FIELD OF THE INVENTION

The document describes methods and captive-air inflatable systems for video display, and notably assemblies for curved or even substantially spherical screens.

BACKGROUND

Curved viewing systems are used widely in the field of simulation to offer pilots or drivers an immersive visual environment based on synthetic images with a wide vertical and horizontal field. There is a wide variety of display types for this type of aeronautical simulation. Various types of screens exist in the field of projection.

Screens used for projection are generally partially spherical or hemispherical. They have a horizontally and vertically curved reflective surface (wide horizontal and vertical field for maximum immersion).

Most screens currently on the market are constructed from "petals" or "panels", that is to say sub-parts of screens that are joined together on a metal structure. These panels are usually manufactured from molds. The choice of dimensions is limited, and the production of screens of different sizes requires the creation of specific tools.

Among many technical problems (for example regarding design and/or manufacture), there is in particular no description as to how to manufacture screens with variable geometry. Obtaining variable screen dimensions is excessively complex and expensive (non-recurring costs, specific or excessive tools, etc.) with known structures. However, this type of spatial reconfiguration on demand is becoming increasingly important, for example in order to adapt to required fields of view or to meet other constraints (for example size of the simulated machine, dimensions of the room where the simulator is installed, etc.).

Traditionally, in the field of video projection, flat or cylindrical screens consist of a canvas. In the case of spherical screens used for simulation, they are generally manufactured from solid panels. These panels are therefore spherical, and may for example be made of plastic or composite. The panels, which are primarily quadrilateral in shape, are created using molds. The set of panels may be self-supporting or assembled on a metal structure.

For truncated spherical screens applied in the field of motionless simulation, the known solution is the one that consists of an assembly of composite petals, placed on a metal structure, puttied and painted. This solution is restrictive, expensive, and slow to deploy.

The patent literature describes few existing solutions to these technical problems. The known approaches are not satisfactory or exhibit limitations. Patent document AU333009 describes for example a modular dome constructed from plastic panels. The use of panels with predefined dimensions barely addresses the technical problem of dimensional variability. Specifically, a mold corresponds to a sphere with a given radius, while each type of simulator may require a sphere with a different radius. In addition, the molds themselves are expensive to manufacture, particularly in the case of composite, and also have an impact on the manufacturing time of the screen, which takes several months. Finally, the operations for creating the screen, such as stacking the composite layers or sanding, are messy and laborious. In the case of sanding, the dust is possibly hazardous to health.

Other approaches consist in producing screens with stretched canvas. The patent literature relating to displays with inflatable structures describes solutions that exhibit limitations. Patent document U.S. Pat. No. 7,791,799 describes a structure comprising two canvases: a dome supports a first canvas fixed on its convex face and a second canvas welded to the first and that is kept in a concave shape by an air depression created between the two canvases by way of a suction device. This approach consumes too much energy. Patent document U.S. D682382 describes a dome-type shelter that is inflatable. This type of structure is called a "captive-air" structure (the structure is either perfectly airtight or kept inflated by a low continuous supply of air). Patent document DE202019100645 describes a shelter with a partially inflatable roof in which a flexible skin adopts the desired shape when the support elements fixed thereto are inflated.

Patent document WO 2007/016328 A1 describes a captive-air device that is based on a "dual-air pressure", consisting in introducing a positive pressure into tubes forming, along with panels, an inflatable structure, and then in introducing a negative pressure between the tubes, the panels and a membrane, so as to allow the membrane to stretch. The negative pressure is then removed. This device has drawbacks including the fact that it is necessary to manage seal tightness between the inflatable structure (the tubes and the panels) and the membrane, which acts as a projection screen.

All of these solutions are beneficial, but they do not, or not entirely, solve the technical problem addressed.

There is a need for improved display methods and systems.

SUMMARY OF THE INVENTION

The document describes methods and devices for video display, notably an assembly comprising: a captive-air inflatable structure in a curved shape or a portion of a truncated sphere; a display medium; and a holding system between said inflatable structure and said display medium. The holding system consists of complementary hooks facing one another, allowing the display medium to be shaped when the inflatable structure is inflated.

Developments describe: the use of flexible screens, notably of OLED type, and/or of screen canvas for video projection; variants of the holding system (mechanical, electrical, etc.), notably tensioners; various arrangements for forming the captive-air inflatable structure; the use of buttresses and/or reinforcement crosspieces; the use of one or more sensors and/or actuators, notably for various servocontrols; the use of one or more short-throw projectors; applications for remote working, video gaming, simulators or the like, associated with screen dimensions of a few meters to a few tens of meters. Some software aspects are described.

In one embodiment, the display system according to the invention is manufactured from a fabric screen, held in place and tensioned in various ways.

Advantageously, the structure according to the invention does not require a mold. The dimensions may be easily determined. There is no need to use materials that are complex to manufacture, such as composites.

Advantageously, the materials that are used (plastic and/or fabrics) are lightweight and compactable, making the display system easy to transport and to deploy.

Advantageously, the materials that are used mean that the complete screen is lightweight and, when it is correctly folded, compact enough to be able to be transported by one or two people.

Advantageously, assembly is simplified (inflate the screen), fast and stable. Assembly may typically be carried out in less than a day by two people, since there is no screwing or any finishing operations to be performed such as sanding, puttying or painting.

Advantageously, the solution addresses the technical problem of dimensional variability since there are no requirements in terms of molds or specific tools. Changing the radius or field of the screen only involves modifying the program and the cutting parameters of the machine cutting the fabrics and/or plastics.

Advantageously, the systems and methods according to the invention do not require mold manufacturing. Deployment and use are significantly accelerated in comparison with the placement of articulated structures.

Advantageously, the described embodiments are modular. Each of the parts of the display has multiple technical variations, thereby making it possible to address a wide range of different needs.

Advantageously, the proposed solution is suitable for the field of image projection for the simulation without relative movement of the one or more video projection systems ("motionless", no dynamic cinema). However, application thereof may be extended to any field using video projection or video display, such as cinema, planetariums and other applications belonging to the fields of leisure, education, or events, etc. In particular, some embodiments enable large-scale installations (for example for helicopter simulation), or, at the other extreme, for home gaming consoles (with more constrained or even cramped dimensions).

BRIEF DESCRIPTION OF THE DRAWINGS

Other features and advantages of the invention will become apparent with the aid of the following description and the figures of the appended drawings, in which.

DETAILED DESCRIPTION

Figure 1:
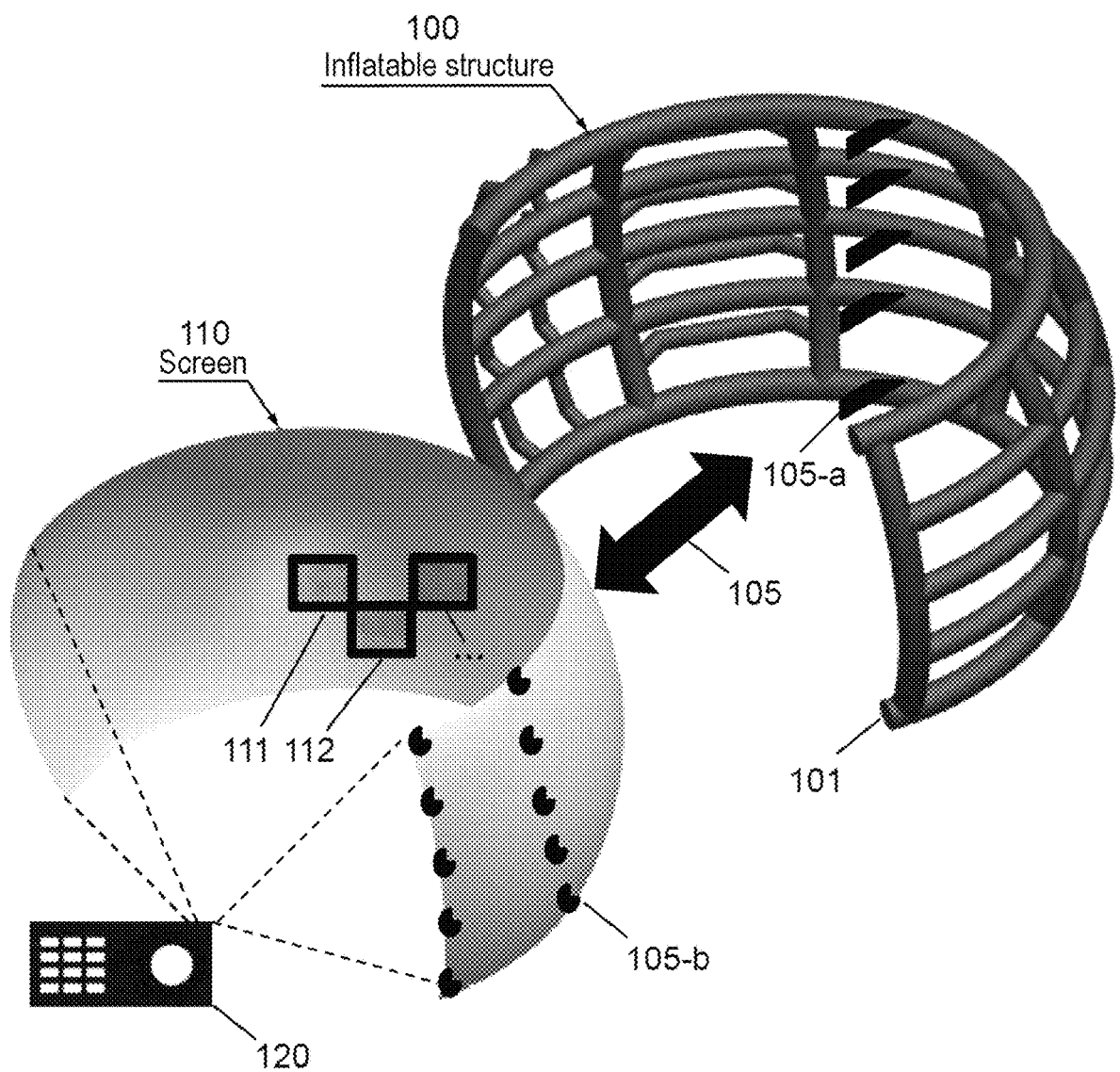
FIG. 1 illustrates one specific embodiment of the invention, in a configuration for video projection.

The assembly according to the invention comprises three parts: i) a fully inflatable captive-air structure, ii) a display medium and iii) an attachment or interconnection system between the inflatable structure and the display medium, which comprises hooks distributed over the surface of the concave part of the inflatable structure and complementary hooks distributed over the convex surface of the display medium, said hooks being connected to complementary hooks facing them so that, when the inflatable structure is inflated, said hooks of the inflatable structure are stretched and shape the display medium.

Each of these three parts may be subject to a large number of variants described below. The way in which they are combined is therefore significant. There are two extremes in the continuum of solutions: the first when the display medium is a projection canvas (for video projection) and the second when the display medium consists of one or more flexible screens. Some embodiments may also combine video projection and a video display screen.

The dimensions of the assembly are variable, typically from 1.50 m in diameter (for example application for video gaming, work sphere or telepresence) to around fifteen meters in diameter (for example helicopter simulator).

For one specific case (helicopter simulator), the perimeter is 18 m on the ground for around 3 m in diameter. The dimensioning ranges from 1 m to 4 m for the radius. The height of the inflatable structure typically allows a viewing angle of 60° (angle from bottom to top) and an F.O.V. of 170° or more (angle from left to right). There are no constraints in terms of geometry or viewing angles. For example, two short-throw projectors may each handle 180° of FOV. Many other configurations are possible.

One or more of the parts of the assembly according to the invention may be instrumented with one or more sensors and/or actuators.

In one embodiment, the inflatable structure comprises one or more inflation points (for example 4 points).

A description is given of an assembly for video display, comprising: an inflatable structure in a curved shape or a portion of a truncated sphere; a display medium; and a holding system between said inflatable structure and said display medium.

A description is given of an assembly for video display, comprising: a captive-air inflatable structure in a curved shape or a portion of a truncated sphere; a display medium; and a holding system between said captive-air inflatable structure and said display medium.

In one embodiment, the captive-air inflatable display system comprises a canvas fixed to the inflatable structure when the latter is inflated, the canvas adopting the desired shape in order to be able to project images onto its concave part.

In one embodiment, the display system uses captive-air technology to create a spherical inflatable structure, with a canvas, adapted to the projection, fixed at multiple points on its concave part and which, when it is inflated, allows the canvas to adopt the desired shape.

A captive-air system is more economical in terms of the energy needed to maintain the structure. The risks of punctures may be managed by compartmentalizing the spaces and/or by increasing the number of inflation points.

The hooks and complementary hooks may be made of those of hook and loop fasteners such as those sold under the trademark Velcro® or the like. The attachment systems may be entirely mechanical (clips), or electromechanical (for example an electromagnet, etc.), or chemical (for example glue).

In one development, the display medium carries one or more flexible screens, in particular of OLED type.

In one development, the display medium is a screen canvas for video projection.

In one development, the holding system (or "attachment system") is an independent part. In another development, the holding system is a perimeter definition that contains, in addition to its own components, parts of the display medium (pre-sewn notches) and/or of the inflatable structure (sewn squares with a rod for attaching the tensioners). The decoupling allows more combinations. In one embodiment, the holding system is reduced to zero: the inflatable structure is attached to the canvas of screens by hook and loop fasteners such as those sold under the trademark Velcro®.

In one development, the holding system corresponds to hooks distributed or to be distributed over the surface of the concave part of the inflatable structure and complements to the hooks distributed or to be distributed over the convex surface of the display medium.

The inflatable structure and the display medium may therefore comprise predefined attachment points configured so as to receive the hooks or complements to the hooks (notably tensioners).

In one development, the holding system comprises tensioners that are manually adjustable and/or remotely controlled.

In one development, the captive-air inflatable structure comprises multiple sub-parts able to be inflated independently of one another, said sub-parts being associated with distinct inflation points. The inflation/deflation may notably be adaptive.

In one development, some or all of the sub-parts of the captive-air inflatable structure are tubular, the tubular sub-parts being welded and/or adhesively bonded to one another.

In one development, the sub-parts of the inflatable structure form patterns. The patterns may form a lattice, or a mesh network or a reticular network. The patterns may be in a checkerboard, in a frieze, in fractals, etc.

In one development, the captive-air inflatable structure is reinforced by one or more buttresses and/or horizontal and/or vertical crosspieces.

In one development, the captive-air inflatable structure is reinforced by an articulated rigid frame. The reinforcing frame may be made of wood and/or metal, and/or made of carbon fiber.

In one development, the inflatable structure and/or the display medium comprise one or more sensors and/or actuators, notably a video acquisition camera and an inflator.

In one development, the assembly according to the invention furthermore comprises a local processor and/or computing resources that are accessed remotely for servo-controlling the inflation/deflation of the captive-air inflatable structure and/or actuators for tensioning the display medium for deformations in the displayed video.

In one embodiment, the assembly according to the invention furthermore comprises one or more cameras for the three-dimensional reconstruction of the shape of the display medium attached to the captive-air inflatable structure, and computing resources for determining the sub-parts to be re-inflated and/or deflated.

In one development, the assembly according to the invention furthermore comprises a laser projector, notably a short-throw laser projector. A short-throw laser projector reduces bulk while at the same time guaranteeing good brightness and contrast conditions. The uses of projection and flexible screens may be combined.

A description is given of a method for managing a captive-air inflatable system for video display, the assembly comprising a captive-air inflatable structure in a curved shape or a portion of a truncated sphere; a display medium; and a holding system between the inflatable structure and the display medium, the holding system having hooks distributed over the surface of the concave part of the inflatable structure and complementary hooks distributed over the convex surface of the display medium. The method comprises at least one step of inflating the inflatable structure, so that complements to the hooks on the convex surface of the display medium connect to hooks facing them on the concave surface of the inflatable structure in order to tension and shape the display medium.

Steps of the method may notably comprise one or more of the steps of: determining the three-dimensional shape of a projection screen, this shape comprising convex parts and/or concave parts; determining the number and the respective shape of the sub-parts of an inflatable structure for supporting said three-dimensional shape; inflating and/or deflating one or more sub-parts of the inflatable structure, notably depending on the deformed parts of the video display.

A description is given of a computer program product, said computer program comprising code instructions for performing one or more steps of the method when said program is executed on a computer.

FIG. 1 illustrates one specific embodiment of the invention, in a configuration for video projection.

In one embodiment, the assembly according to the invention comprises a fully inflatable captive-air structure 100 that receives and carries 105 a screen canvas 110.

Video Projection

The screen canvas serves as a medium for projection-based video display (one or more video projectors, for example a video projector 120, may be used). The video projectors may be mounted on metal gantries (not shown), notably at a height. It is possible to use one or more short-throw video projectors, which will then be placed almost against the canvas display medium.

Captive Air Embodiment

This fully inflatable embodiment is particularly advantageous in terms of compactness (when it is folded, the structure may fit in a backpack or a travel suitcase) and correlatively deployment speed (for example electrical inflation requires less than five minutes, and even less if multiple inflation inputs are provided). No special skills or qualifications are required to perform the installation.

Captive Air

The various embodiments of the invention use captive air to maintain the inflatable structure. A pressure of around 0.15 to 0.3 bar above atmospheric pressure. The system is therefore airtight.

Inflatable Structure 100

In more detail, the structure 100 has a curved shape or a portion of a truncated sphere. Composed of sleeves or tubes, the inflatable structure may comprise one or more inflation points for example 101, depending on whether the air is compartmentalized into one or more sub-parts (management of the risk of punctures, or faster inflation options, etc.). Elements for reinforcing the inflatable structure will be described below.

In one embodiment, the captive-air inflatable structure is made of a fabric (resistant to punctures) comprising multiple sub-layers of different materials: for example polyurethane for the inner tube (of a thickness of 80 microns to 150 microns) and a layer of Dacron, which is a textile melted into a resin (particularly resistant to traction effects). A wide variety of canvas is possible (variations in the layers, weaving, etc.).

New materials may partially allow self-repair of leaks. Current self-healing materials comprise three categories of self-healing mechanisms (for example microcapsules, vascular networks or intrinsic). In microcapsule-based materials, a healing agent is protected within tiny spherical shells, which rupture in the event of damage. In vascular materials, the healing agent is transported by a network of capillaries. With regard to intrinsic self-healing materials, the property is usually inscribed in the chemical network of the polymer material (molecular repairs, such as the creation of hydrogen bonds, ionic interactions and the mobility and entanglement of polymer chains).

The geometry of the inflatable structure may be highly varied (the illustrations show rectangular structures, but sleeves oriented other than horizontally or vertically make it possible to implement various patterns and lattices). A lattice may be a triangulated system, formed by the assembly of vertical, horizontal and diagonal bars forming notably triangles, such that each bar experiences an acceptable force, and that the deformation of the assembly is moderate. In one embodiment, the inflatable structure comprises squares of around 40 cm by 40 cm.

Canvas Display Medium 110

In one embodiment, the projection canvas meets optical/visual requirements (grain, reflectance, resolution, reflected brightness, etc.). In the aeronautical case, for simulators, the regulator prescribes for example tolerances with standards in terms of resolution, contrast, fabric quality, etc.; the regulations also impose minimum or maximum values of distance, diameter, etc., which serve to constrain the various devices.

For an immersive virtual reality application, notably for video gaming, a gaming console coupled to a short-throw projector and an assembly for the video display according to the invention allow "local cooperation" ("couch co-op"), which is not naturally possible with virtual reality (VR) headsets, which may have too many limitations for some uses and some personal preferences. Remote working may also benefit from the embodiments of the invention (a personal office table may comprise and deploy a display surface according to the invention, through video projection, with a short throw or from behind). A large flexible screen also requires a conformation medium for the inflatable structure.

In one embodiment, the screen canvas 110 is formed from a single piece (for example fabric composed of textile and/or plastic fibers; the composition of the screen canvas may be variable, in particular in terms of surface granularity). This embodiment is advantageous in that the screen canvas may be rolled and/or folded: like the inflatable structure, easy and fast deployment, and of compact form when folded.

In one embodiment, the screen canvas is flexible and relatively non-deformable (for example boat sail).

In one embodiment, the screen canvas is flexible and stretchable.

In one embodiment, the canvas is made of elastomer. In one embodiment, the display medium consists of a single screen canvas (fabric fiber mixed with elastics, or even elastane).

In one embodiment, the screen canvas 110 is woven with the incorporation, during the weaving process, of prestresses (for example tensions, extensions, tractions, etc.) into the fabric (for example elastic fibers may be woven while stretched). In particular, the canvas may be woven in a single part or in multiple sub-parts able to be assembled so as to position the canvas in a configuration in a portion of a sphere.

In one embodiment, the screen canvas 110 comprises multiple sub-parts (for example 111, 112, etc.), which may be relatively rigid and/or flexible. Specifically, it is possible to differentiate between various viewing areas: the central parts may be made of panels that are more rigid than the parts to be arranged or curved. For example, for a video gaming application, a gaming console associated with a short-throw video projector may be placed in an inflatable structure according to the invention: polygonal facets may pave the surface of the screen canvas (video display deformations making it possible to adjust the very high curvature of living room equipment).

Interconnection or Holding System 105

The holding device 105 (or attachment or interconnection "subsystem") between the inflatable structure and the screen canvas may be implemented in various ways: mechanical (for example hook and loop fasteners such as those sold under the trademark Velcro®, springs), magnetic (magnets), electromagnetic (electromagnet), chemical (glue), or a combination of these methods.

In particular, the attachment system (105) may comprise hooks (105-a) distributed over the surface of the concave part of the inflatable structure (100) and complementary hooks (105-b) distributed over the convex surface of the display medium (110) in order to connect thereto.

In one embodiment, all or some of the hooks (105-a) of the inflatable structure are connected to complementary hooks (105-b) positioned facing them on the display medium, so that, when the inflatable structure is inflated, the hooks of the inflatable structure connected to complementary hooks of the display medium are stretched and make it possible to shape the display medium.

In one embodiment, the system according to the invention comprises a multitude of tensioners. These tensioners may be adjustable once and for all (static), so as to adjust the final shape of the inflatable structure, but also dynamically controllable (springs or electric actuators). The canvas may be fixed to the inflatable structure by tensioners (for example small clips or tensioners) the distribution of which aims to ensure good homogeneity of the tension of the canvas.

Figure 2:
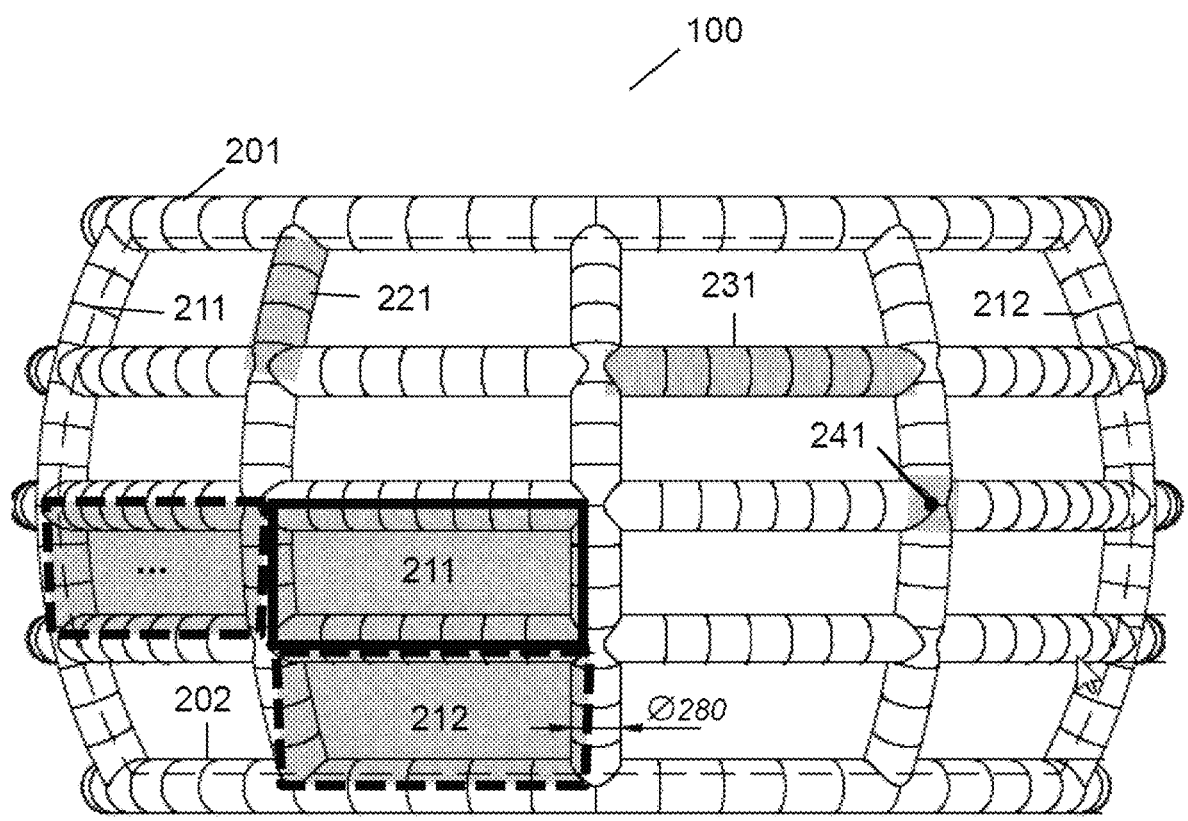
FIG. 2 illustrates one example of an embodiment of the invention, in a configuration with flexible screens.

FIG. 2 illustrates one example of an embodiment of the invention, in a configuration with flexible screens.

In this embodiment, the inflatable structure is composed of vertical and horizontal sleeves 221 and 231, which may be melted or adhesively bonded or attached or integrated 241. In one embodiment, this time, the inflatable structure may be configured so as to carry flexible screens: the display comes directly from the flexible screens 211, 212, etc.

The electric and video cables, where necessary, may be inserted into the various sleeves, or even contribute to stiffening the inflatable structure.

Flexible Screens

Flexible screens using OLED technology are now achievable. The latest models were notably presented to the public at CES 2018 ("Consumer Electronics Show", Las Vegas). Some manufacturers have shown that screens exhibiting these types of properties may be curved to the point of being rolled up or able to be rolled up, bendable and deformable in various ways.

Since flexible screens are particularly thin and lightweight, captive-air inflatable structures may be adapted to support screens.

Stretchable electronics refers to various usable technologies. In the manufacture of conventional liquid-crystal screens, glass is used as substrate. If a plastic or metal sheet is used, the whole system may become flexible, due to the low thickness of the film deposited on the substrate (a few μm). A flexible printed circuit board (flex PCB or flex circuit) is for example a printed circuit technology that consists in using a high-performance plastic substrate, such as polyimide (Kapton) or PEEK film. Other technologies are referenced as electronic textiles ("e-textile"), some technologies of which converge with that of stretchable electronics.

The display technologies able to be used for flexible screens comprise notably organic light-emitting diode screens or OLED screens, as they are usually denoted. Many other technologies may be used: Organic light-emitting transistors, usually denoted OLET, surface-conduction electron-emitter display screens, usually denoted SED screens, field emission display screens, usually denoted FED screens, telescopic pixel display screens, usually denoted TPD screens, laser-powered phosphor display screens, usually denoted LPD screens, ferro-liquid crystal display screens, usually denoted FLCD screens, thick-film dielectric electroluminescent technology, usually denoted TDEL, etc.

The "distribution" (spatial arrangement) of the screens may be varied. For example, one architecture may consist in increasing the number of small flexible screens in the center of the display, while larger panels/screens will be used for peripheral vision.

Paving of the Truncated Hemisphere

The various techniques for paving the desired surface may be applied to the configuration with an overhead projector and/or with flexible screens.

In some embodiments, the two modes may be combined; for example in a full rhombicuboctahedron, the 18 square faces may be flexible screens and the 8 triangular faces may be subject to one or more projections; in a half rhombicuboctahedron, these figures are adjusted; 5 squares (screens) and 4 triangles (projection) may be sufficient.

In mathematics, a geode is a convex polyhedron inscribed in a sphere that it approximates. Some architectural structures notably comprise geodesic domes.

In one advantageous embodiment, the paving is in the shape of a soccer ball, that is to say in the form of a part of a truncated icosahedron (complete, the shape comprises 12 regular pentagonal faces, 20 regular hexagonal faces, 60 vertices and 90 edges). Many other pavings are possible with squares or rectangles and adjustment of the display per screen and/or per projection.

The joining of the screens, like the production of multi-part tiles, may be made practically invisible. If necessary, a join of a few millimeters does not block anything (video may be projected on the uprights so as to smooth out any irregularities, etc.).

Figure 3:
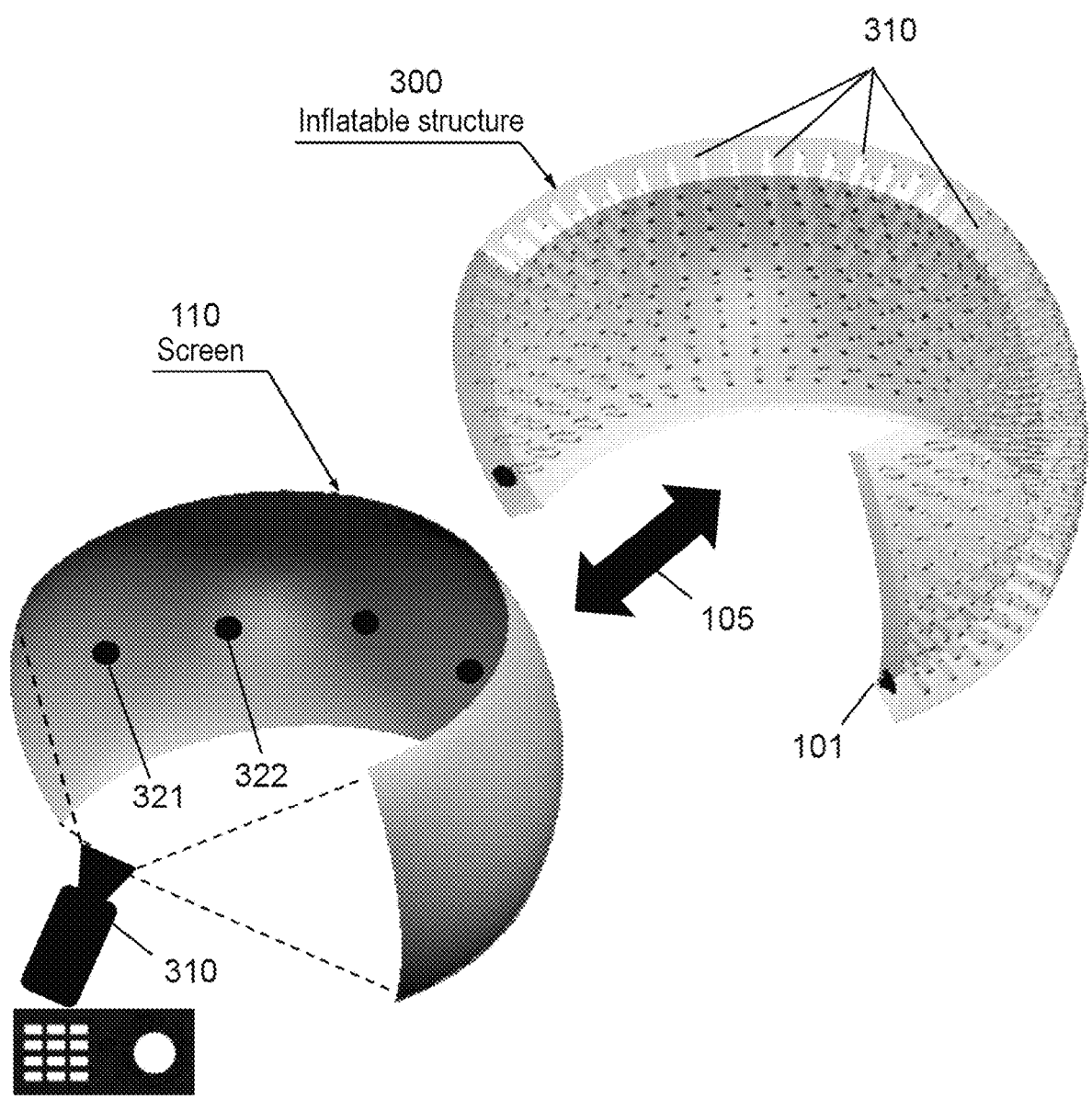
FIG. 3 illustrates one exemplary embodiment of the invention, with instrumentation and servo-control.

FIG. 3 illustrates one exemplary embodiment of the invention, with instrumentation and servo-control.

In one embodiment, the elements (310) of the inflatable structure (300) are suction tubes, which make it possible to attract/keep the canvas in position on the captive-air inflatable structure.

In one embodiment, the captive-air inflatable structure (300) and/or the display medium and/or the interconnection subsystem (105) comprises one or more sensors (321, etc.) and/or actuators (for example 322, etc.), i.e. "sensors and actuators".

A sensor is a device that transforms the state of an observed physical quantity into a usable quantity. Used with an acquisition system, the sensors may be used to implement one or more feedback loops. The sensor may be an accelerometer, an inclinometer, a gyrometer, a gyroscope, etc.

An actuator is an object that transforms the energy that is supplied thereto into a physical phenomenon that provides work or modifies the behavior or the state of a system. The actuator belongs to the operative part of an automated system. The energy may notably be pneumatic, hydraulic (water or oil), electrical, or mechanical, or thermal (for example heating of the captive air). The actuator may be a jack, an electromagnet, a motor, a heating resistor, an acoustic speaker, etc. The sensors and actuators may be macroscopic, but also of very small dimensions (for example MEMS).

In one embodiment, the interconnection subsystem 105 comprises multiple actuators so as to adjust the tension of the projection canvas.

Servo-Control(s)

The use of captive air and suitable materials generally guarantees very high stability of the inflatable structure. However, in some difficult usage contexts (for example public places, building site conditions, etc.), it is possible to provide a feedback loop (for example servo-control of the inflation to deformation measurements).

In one development of the invention, the inflatable structure and/or the canvas are instrumented with position sensors, and a feedback loop with the video projection makes it possible to maintain a stable image.

Thus, in some specific embodiments, the captive-air inflatable structure may be instrumented in the sense that the geometry thereof may be monitored (for example position sensors, tracking cameras, etc.). Deformations (air currents, impacts, slow drift, attenuations, etc.) may be compensated for in real or almost real time. This type of compensation may be lightweight (need for a fixed independent surveillance camera (320), use of markers or sensors or actuators (321, 322, etc.), detection of deformed areas and compensation through re-inflation/deflation of one or more sub-parts of the structure).

The geometric approximation may be compensated for by the geometric deformation of the display (which is computed before the sending of the data to be displayed, through projection and/or by a flexible screen). A video projector is able to mechanically compensate for a trapezoidal projection; but more generally, logically, knowing the geometry of the display surface, it is possible to deform the geometry of the video to be displayed so that the deformed video is compensated for ("erased") by the display surface and the viewer has the impression of a flat display. In particular in a square room, it is possible to "treat" the corners of the room to approximate a spherical projection. In the various paving modes that are described below, the video display may be deformed so as to correspond to the deformation of the display surface.

In the illustrated embodiments, the tensioners serve as a support for attachment to the various flexible screens etc. The layout and geometry of the flexible screens may be designed in various ways (fractals, patterns, etc.).

Figure 4:
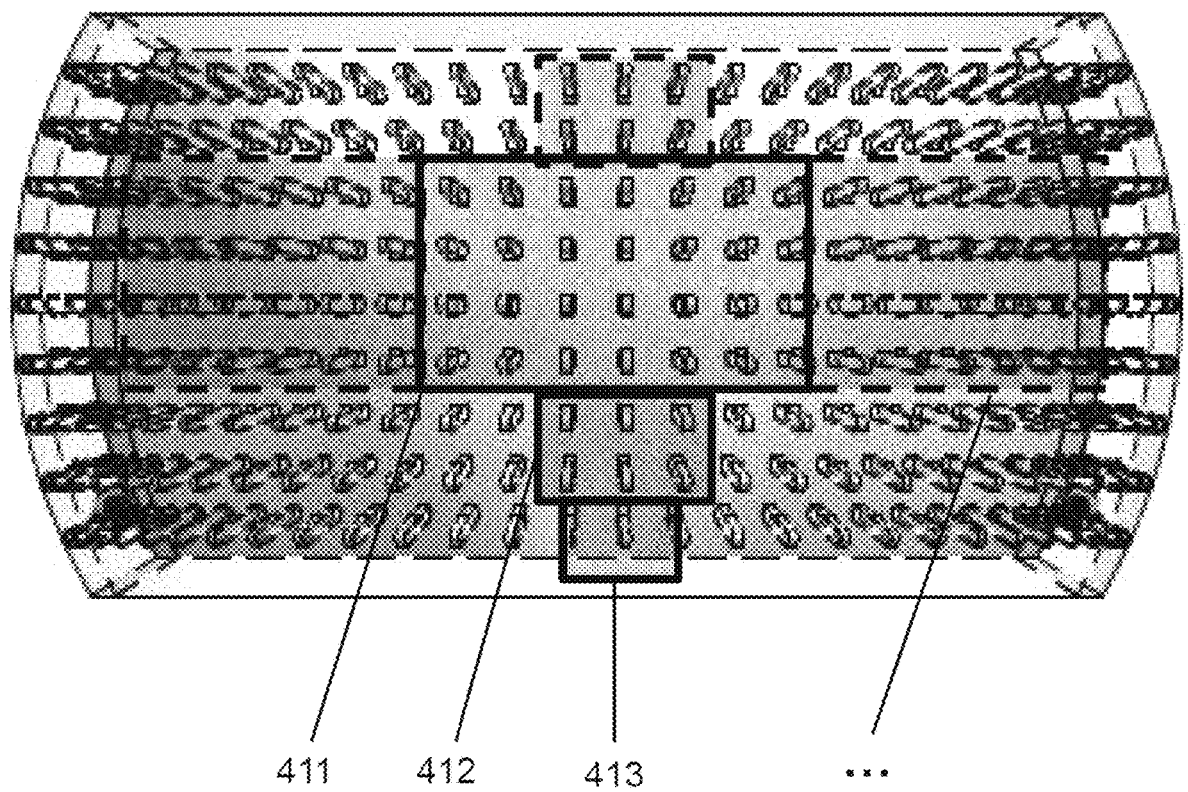
FIG. 4 illustrates one specific exemplary embodiment of the invention.

FIG. 4 illustrates one example of reinforcement for the inflatable structure, in one specific embodiment of the invention.

For example, the central region may be occupied by a large screen (411) while the peripheral vision areas such as (413) may be paved by smaller flexible screens.

Figure 5:
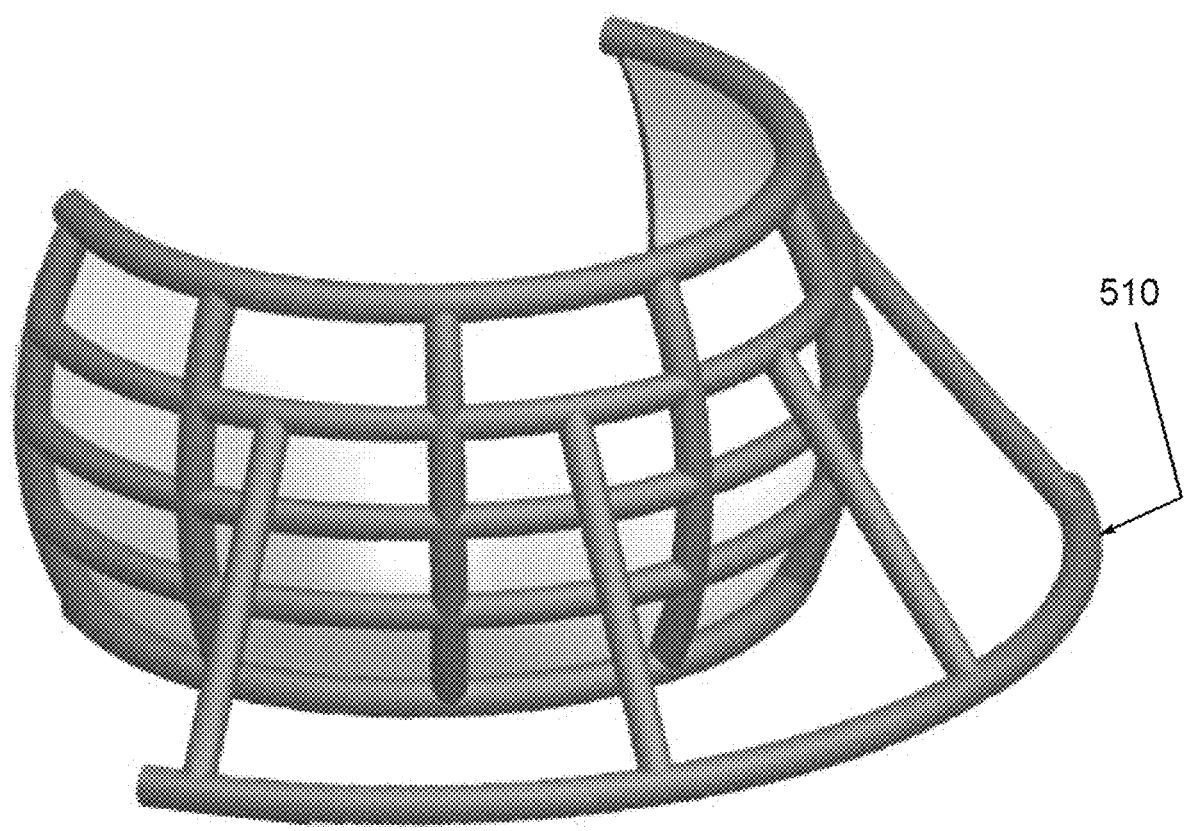
FIG. 5 illustrates one example of reinforcement for the inflatable structure, in one specific embodiment of the invention.

FIG. 5 illustrates one example of reinforcement for the inflatable structure, in one specific embodiment of the invention.

Optionally, reinforcements, abutments, arches or buttresses (510) may be used to reinforce the holding of the captive-air inflatable structure. In architecture, a buttress is a raised reinforcement on the outer face of a vaulted building that serves to contain the effects of a load or the thrust of arches and vaults.

Figure 6:
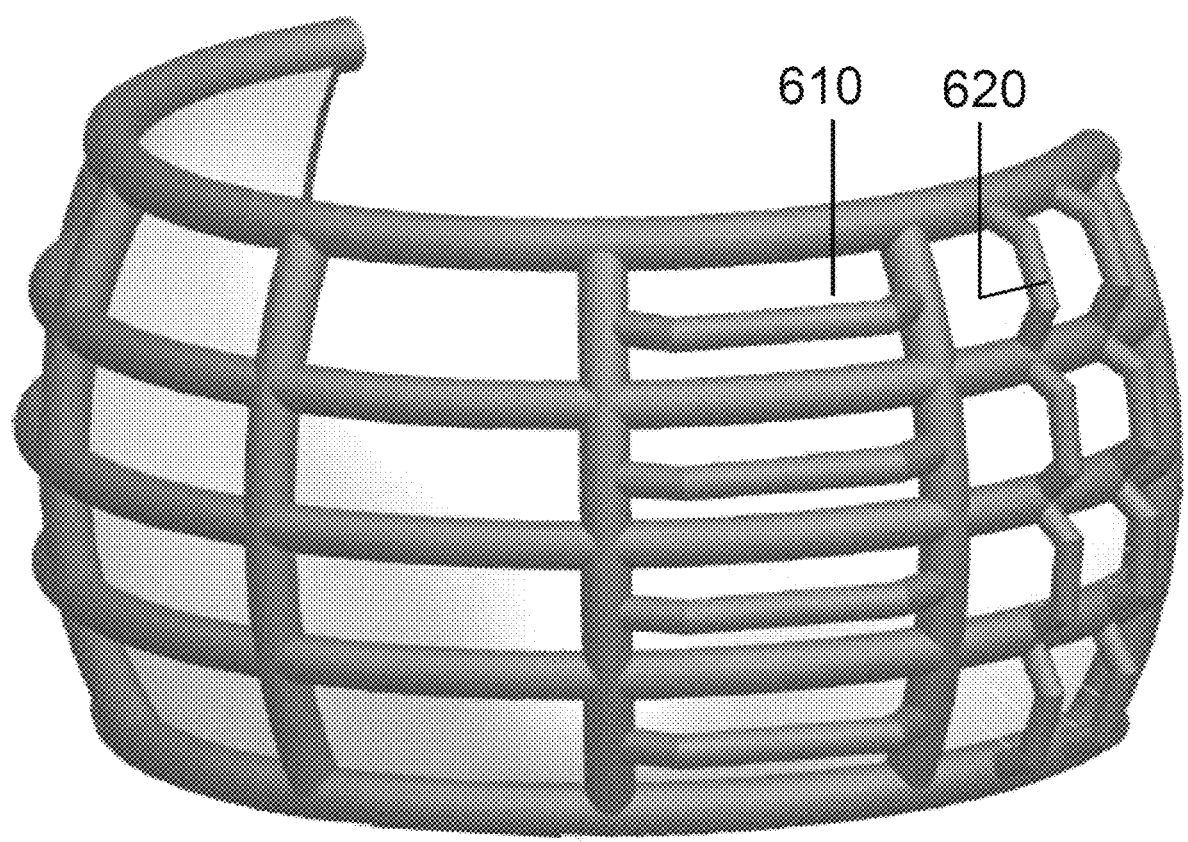
FIG. 6 illustrates another example of reinforcement for the inflatable structure, in one specific embodiment of the invention.

FIG. 6 illustrates another example of reinforcement for the inflatable structure, in one specific embodiment of the invention.

Horizontal and/or vertical crosspieces (610) and/or (620) may also be used to reinforce the holding of the captive-air inflatable structure and ensure the correct tension of the projection screen.

The invention may be implemented based on hardware and/or software elements. It may be available as a computer program product on a computer-readable medium. The medium may be electronic, magnetic, optical or electromagnetic. The computing means or resources may be centralized and/or be distributed ("Cloud computing"), possibly with or using peer-to-peer and/or virtualization and/or redundancy technologies. The software code may be executed on any suitable processor (for example a microprocessor) or processor core or set of processors, whether provided in a single computing device or distributed between multiple computing devices. The computerized implementation of the invention may use centralized systems (for example client-server or master-slave) and/or distributed systems (for example peer-to-peer architecture using accessible computing resources, possibly opportunistically, for example ad-hoc networks, etc.). The system (or its variants) implementing one or more of the steps of the method may use one or more dedicated electronic circuits or a general-purpose circuit. The method may also be implemented on a reprogrammable computing machine (a processor or a microcontroller, for example) executing a program comprising a sequence of instructions, or on a dedicated computing machine (for example a set of logic gates such as a programmable logic array, usually denoted FPGA (acronym for field-programmable gate array) or an application-specific integrated circuit, usually denoted ASIC, or any other hardware module). A dedicated circuit may notably improve performance. The reference to a computer program that, when it is executed, performs any of the functions described above is not limited to an application program running on a single host computer. On the contrary, the terms "computer program" and "software" are used herein in a general sense to refer to any type of computer code (for example application software, firmware, microcode, APIs, web services, or any other form of computer instruction) that may be used to program one or more processors to implement steps of the method.

The invention claimed is:

1. An assembly for video display, comprising:
a captive-air inflatable structure in a curved shape or a portion of a truncated sphere;
a display medium; and
a holding system between said inflatable structure and said display medium;
the assembly wherein the holding system comprises hooks distributed over the entire surface of the concave part of the inflatable structure and complement of the hooks distributed over the entire convex surface of the display medium; and in that
all or some of said hooks are connected to the complement of the hooks positioned facing them, so that, when the inflatable structure is inflated, said hooks of the inflatable structure connected to the complement of the hooks of the display medium are stretched and make it possible to shape the display medium.

2. The assembly as claimed in claim 1, wherein the display medium is a screen canvas for video projection.

3. The assembly as claimed in claim 1, wherein the display medium carries one or more OLED flexible screens.

4. The assembly as claimed in claim 1, wherein the holding system comprises at least one mechanical, magnetic, electromagnetic, or chemical attachment.

5. The assembly as claimed in claim 1, wherein the holding system comprises tensioners that are manually adjustable and/or remotely controlled.

6. The assembly as claimed in claim 1, wherein the captive-air inflatable structure comprises multiple sub-parts able to be inflated independently of one another, said sub-parts being associated with distinct inflation points.

7. The assembly as claimed in claim 1, wherein the captive-air inflatable structure comprises sub-parts, wherein some sub-parts of the captive-air inflatable structure are tubular, the sub-parts are welded and/or adhesively bonded to one another.

8. The assembly as claimed in claim 1, wherein the captive-air inflatable structure comprises sub-parts, wherein the sub-parts of the inflatable structure form patterns.

9. The assembly as claimed in claim 1, wherein the captive-air inflatable structure is reinforced by one or more buttresses and/or horizontal and/or vertical crosspieces.

10. The assembly as claimed in claim 1, wherein the captive-air inflatable structure is reinforced by an articulated rigid frame.

11. The assembly as claimed in claim 1, wherein the inflatable structure and/or the display medium comprise one or more sensors and/or actuators, wherein the one or more sensors and/or actuators comprises a video acquisition camera and an inflater.

12. The assembly as claimed in claim 11, further comprising a local processor and/or computing resources that are accessed remotely for servo-controlling the inflation/deflation of the captive-air inflatable structure and/or actuators for tensioning the display medium for deformations in the displayed video connected through an electronic circuit.

13. The assembly as claimed in claim 1, further comprising a laser projector.

14. A method for managing an assembly for video display, the assembly comprising a captive-air inflatable structure in a curved shape or a portion of a truncated sphere; a display medium; and a holding system between said inflatable structure and said display medium, the holding system having hooks distributed over the entire surface of the concave part of the inflatable structure and complement of the hooks distributed over the entire convex surface of the display medium, all or some of said hooks being connected to the complement of the hooks positioned facing them;
the method comprising at least one step of inflating the inflatable structure, so that the hooks of the inflatable structure connected to the complement of the hooks of the display medium are stretched and make it possible to shape the display medium.

15. A computer program product, said computer program product comprising code instructions stored on a computer-readable medium of a computer causing said computer to control the assembly for video display to perform the steps of the method as claimed in claim 14 when said computer program product is executed on said computer.

* * * * *

UNITED STATES PATENT AND TRADEMARK OFFICE
CERTIFICATE OF CORRECTION

PATENT NO. : 12,339,575 B2  
APPLICATION NO. : 17/789118  
DATED : June 24, 2025  
INVENTOR(S) : Ekko Pineau et al.

Page 1 of 1

It is certified that error appears in the above-identified patent and that said Letters Patent is hereby corrected as shown below:

In the Claims

In Claim 1, Column 11, Line 60, "and complement of the hooks" should be -- and complements of the hooks --.

In Claim 1, Column 11, Line 63, "connected to the complement" should be -- connected to the complements --.

In Claim 1, Column 11, Line 66, "connected to the complement" should be -- connected to the complements --.

In Claim 14, Column 12, Line 51, "and complement of the hooks" should be -- and complements of the hooks --.

In Claim 14, Column 12, Line 54, "connected to the complement" should be -- connected to the complements --.

In Claim 14, Column 12, Line 57, "connected to the complement" should be -- connected to the complements --.

Signed and Sealed this  
Fifth Day of August, 2025

Coke Morgan Stewart  
*Acting Director of the United States Patent and Trademark Office*